April 16, 1968   C. E. FRANTZ ET AL   3,377,886
SPEED REDUCER
Filed Aug. 2, 1966   3 Sheets-Sheet 2
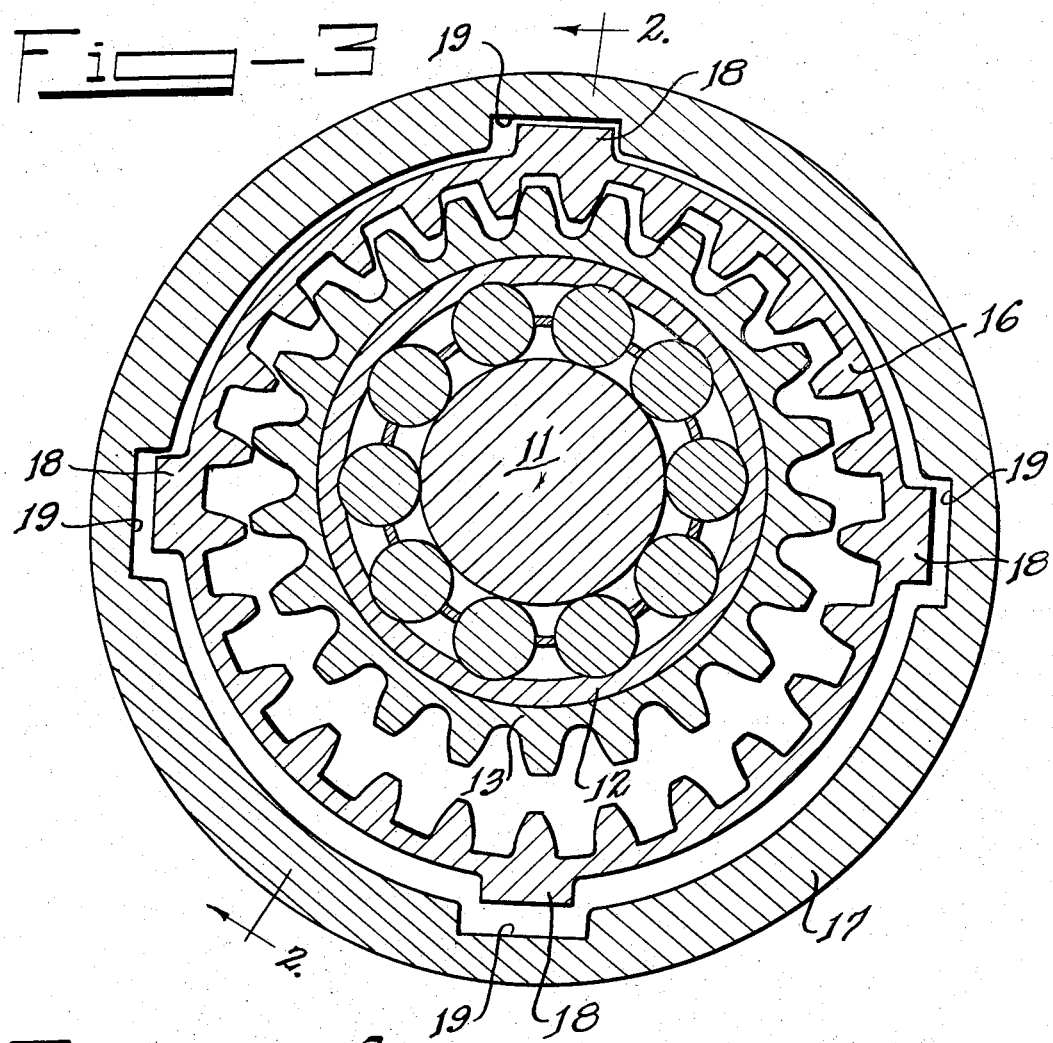
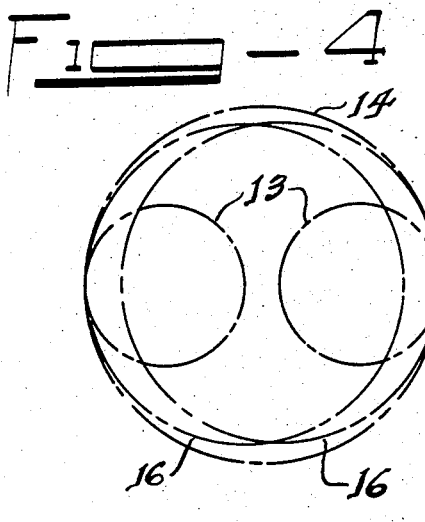
Inventors
Charles E. Frantz
Frank F. Vlacil
By: Roland A. Anderson
Attorney

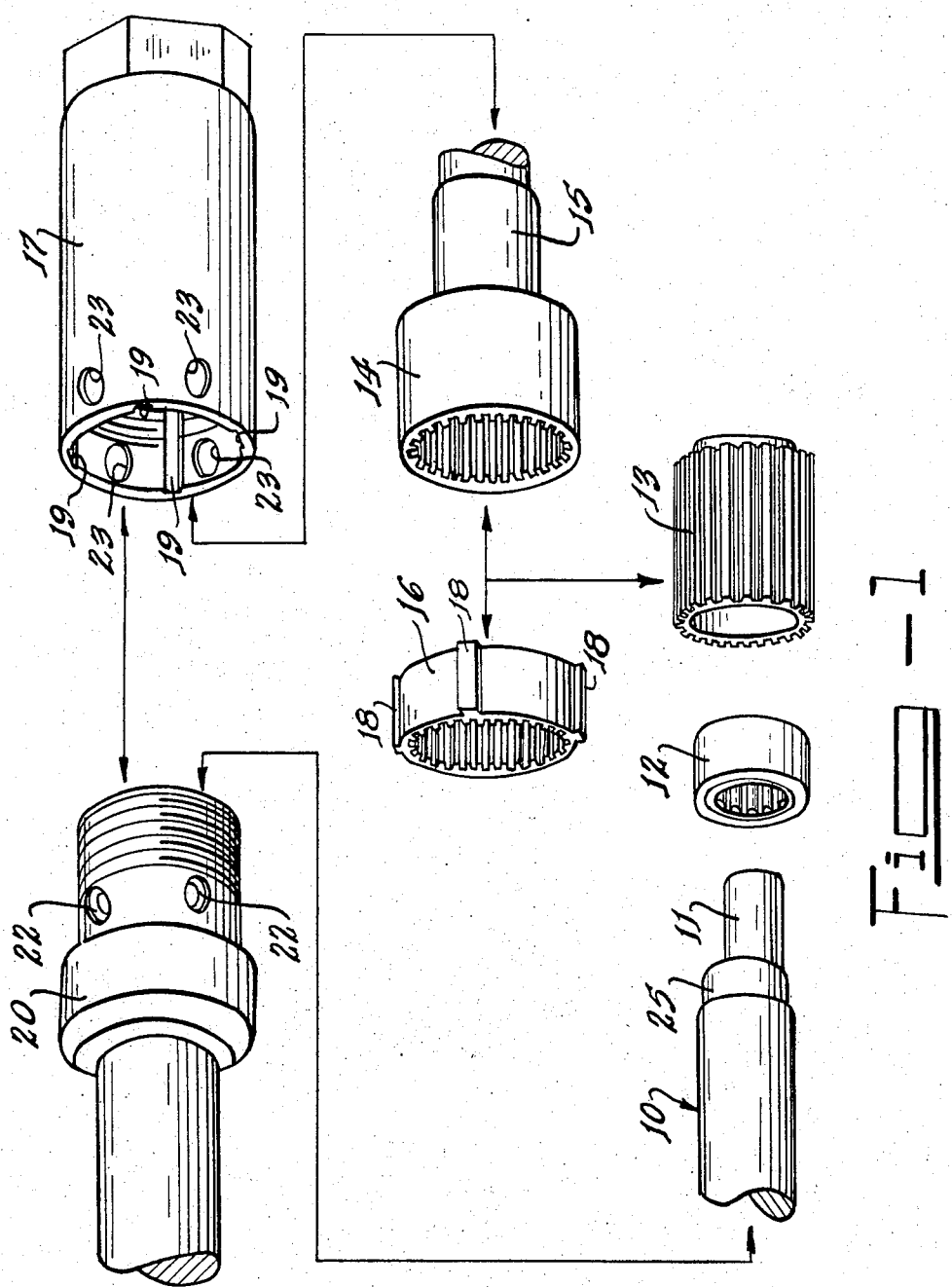

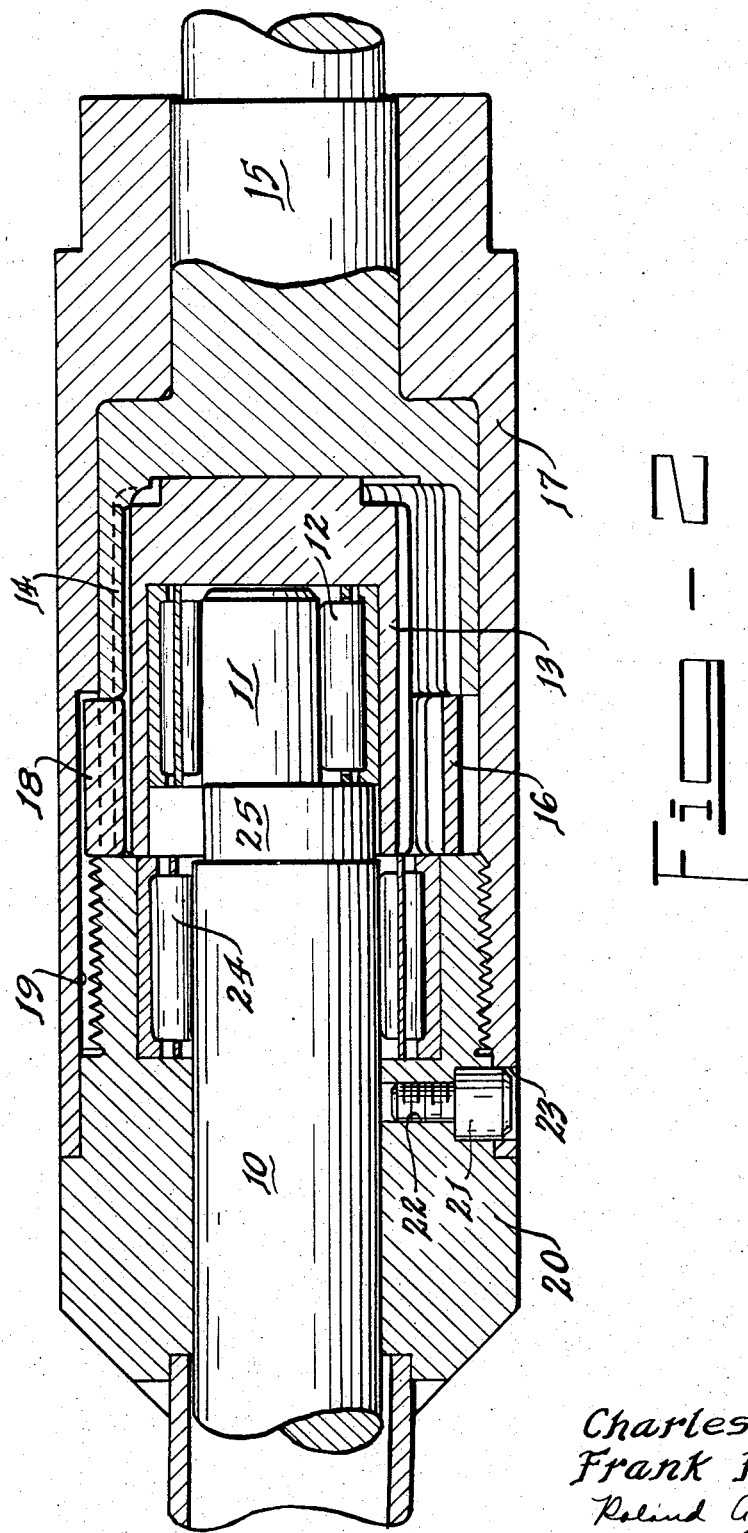

United States Patent Office 3,377,886
Patented Apr. 16, 1968

3,377,886
SPEED REDUCER
Charles E. Frantz and Frank F. Vlacil, Richland, Wash., assignors to the United States of America as represented by the United States Atomic Energy Commission
Filed Aug. 2, 1966, Ser. No. 569,758
4 Claims. (Cl. 74—805)

ABSTRACT OF THE DISCLOSURE

A gear reduction apparatus utilizing a single eccentrically mounted planet pinion in mesh with two internally toothed gears of different pitch diameter but the same diametral pitch. The smaller of the two gears is loosely mounted to allow for the difference in pitch diameter.

---

This invention relates to a speed reducer. More specifically, the invention relates to a speed reducer providing a high ratio of speed reduction and characterized by a relatively small diameter.

The present speed reducer can be used wherever high torque is required at the end of a long slender shaft, for example, in the repair of a nuclear reactor having a large mass of graphite blocks in which long coolant channels are formed. The channels become crooked or warped because of graphite growth or distortion due to reactor operation, and it is necessary to ream out these channels by means of axially rotating cutters fed through the channels. The channels, being long and narrow, require the cutters to be at the ends of long slender driving shafts. Since the high torque required for reaming the channels would twist a long slender shaft, it is necessary for a speed reducer to be connected between the cutter and the end of the shaft. Since the speed reducer, like the cutter, must pass through the long narrow channel being reamed, the speed reducer must be of relatively small diameter.

The speed reducer of the present invention has a long planetary pinion with a single set of gear teeth throughout its length and nonrotatable internal gear member meshing therewith and loosely mounted for rotation of its axis in a small circle during revolution of the planetary pinion. The nonrotation and loose mounting of this gear member enables an input shaft acting through an eccentric extension, the planetary pinion journalled thereon, and a rotatable internal gear member meshing with the planetary pinion and coaxially attached to an output shaft, to drive the output shaft at a small fraction of the speed of the output shaft.

Because the planetary pinion has the same set of gear teeth throughout its length, the pinion, which is hollow and encloses a bearing on the eccentric extension of the input shaft, is simple in construction and has a relatively small radial or annular thickness. Thus the outer diameter of the pinion is relatively small, and the overall diameter of the casing enclosing the internal gear members enclosing the pinion is relatively small. Thus the speed reducer is well adapted to the narrow channels of the reactor to be repaired.

The planetary pinion can have a single set of gear teeth throughout its length, because the rotatable and nonrotatable gear members have the same diametral pitch. Rotation of the rotatable gear member in responsive to revolution of the planetary pinion occurs, because the rotatable gear member has a slightly greater number of teeth than the nonrotatable gear member. The gear members can have the same diametral pitch, in spite of not having the same number of teeth, because they have different pitch diameters. They can have different pitch diameters, because the nonrotatable gear member is loosely mounted for rotation of its axis about a small circle.

In the drawings:
FIG. 1 is an exploded perspective view of the novel speed reducer of the present invention;
FIG. 2 is a longitudinal sectional view of the speed reducer taken on the line 2—2 of FIG. 3;
FIG. 3 is a tranverse sectional view taken on the line 3—3 of FIG. 2; and
FIG. 4 is a diagrammatic view showing the relationship of gears of the speed reducers at their pitch circles in different position.

Referring to FIGS. 1 and 2, an input shaft 10 has an eccentric extension 11, on which there is journaled by means of a roller bearing 12, a long planetary pinion 13 having the same set of gear teeth throughout its entire length.

The pinion 13 meshes over a portion of its length with a rotatable internal gear member 14, which is formed as an extension of an output shaft 15. The pinion 13 meshes over the balance of its length with a nonrotatable internal gear member 16, which has the same diametral pitch as the rotatable gear member 14 and the pinion 13 and a somewhat smaller pitch diameter and number of teeth than the rotatable gear member 14.

As shown in FIG. 3, the nonrotatable gear member 16 is loosely mounted in a stationary casing member 17. The nonrotatable gear member 16 has four external longitudinal keys 18 distributed about its periphery. The keys 18 are loosely received in four longitudinal keyways 19, which are formed on the interior of the casing member 17. Because of the keys 18 and keyways 19 and the loose fit of the nonrotatable gear member 16 and the casing member 17, the gear member 16 is permitted to oscillate without rotation, and its center may move in a small circle.

Because the nonrotatable gear member 16 can move without rotating as aforesaid, the planetary pinion 13, in response to rotation of the input shaft 10 and the eccentric extension 11 journalling the planetary pinion, may revolve while continuously meshing both with the rotatable gear member 14 and with the nonrotatable gear member 16. As the planetary pinion 13 completes one revolution in response to one rotation of the input shaft 10, the nonrotatable gear member 16 oscillates away from and back to its original position, and the rotatable gear member 14 rotates an amount dependent on the difference between the number of teeth on gear member 14 and that on gear member 16. By way of example, rotatable gear member 14 may have 26 teeth and nonrotatable gear member 16, 25 teeth. In this instance, the rotatable gear member 14 and the output shaft 15 make 1⁄26 of a revolution for each revolution of the planetary pinion 13 and each rotation of the input shaft 10. Thus, the speed reduction is 26 to 1, and the torque multiplication is 26 to 1.

The advantages in the use of the planetary pinion 13 with the single set of gear teeth throughout its length will be discussed presently. Since both internal gear members 14 and 16 mesh with the same set of gear teeth on the pinion 13, the nonrotatable gear member 16 must have a smaller number of teeth than the rotatable gear member 14, and thus a smaller pitch diameter, in order that the rotatable gear member 14 may rotate at all as the planetary pinion 13 revolves. Since gear members 14 and 16 mesh with the same set of gear teeth on the pinion 13, the gear members 14 and 16 must have the same diametral pitch. With the same diametral pitch, the nonrotatable gear member 16 can have a smaller number of teeth than the rotatable gear member 14 only by having a smaller pitch diameter.

Attention is now directed to FIG. 4, in which the pinion 13 and the gear members 14 and 16 are represented by their pitch circles. Two positions of the pinion 13, 180° apart, are shown. The rotatable gear member 14 merely rotates; its axis does not shift; and so gear member 14 appears to have only one position. As the pinion 13 moves from its left-hand position to its right-hand position, the nonrotatable gear member 16, being in mesh with the pinion 13 in both positions, shifts from its left-hand position to its right-hand position. The amount the gear member 16 shifts equals the difference in pitch diameters of the gear members 14 and 16. Thus the amount of diametral play between the nonrotatable gear member 16 and the casing member 17 and the play between the keys 18 and keyways 19 tangential to the exterior of the gear member 16 must be at least equal to the difference in the pitch diameters of the gear members 14 and 16. As the pinion 13 rolls about the interior of the gear member 14 the gear member 16 also moves about the gear member 14 with its pitch circle continuously tangent to that of the gear member 14. Thus the center of the gear member 16 moves on a circle whose diameter is equal to the difference in the pitch diameters of the gear members 14 and 16.

The advantages of the planetary pinion 13 with its single set of gear teeth extending throughout its length is that the pinion is simple in construction and that it is relatively thin when considered radially, i.e., between the bearing 12 and the gear members 14 and 16. Thus the overall diameter of the speed reducer, namely, the outer diameter of the casing member 17, is relatively small. If, on the other hand, the pinion 13 had two sets of gear teeth of different diametral pitch, cutting of the two sets of teeth on a single blank would be very difficult. If, instead, the pinion 13 with two sets of gear teeth were formed of separate gear sections secured to one another, this arrangement would undoubtedly increase the radial thickness of the pinion and the overall diameter of the speed reducer.

Another factor that contributes to holding down the overall diameter of the speed reducer is to have the pitch diameter and number of teeth of the planetary pinion 13 relatively close to the pitch diameters and numbers of teeth, respectively, of the internal gear members 14 and 16. Thus, as previously stated, the gear members 14 and 16 have 26 and 25 teeth, respectively. The pinion 13 has 22 teeth. The pitch diameter of the gear member 14 is 13/11 of the pitch diameter of the pinion 13.

An advantage in having the number of teeth on pinion 13 close to the number of teeth on the gear member 14 and both numbers of teeth relatively large so that a relatively large number of teeth of the pinion and the gear member are always in engagement, and thus the torque transmitted can be relatively high.

As shown in FIG. 2, the casing member 17 has a threaded connection with a housing 20 and is secured thereto against unthreading of the connection by a plurality of screws 21, only one of which is shown in FIG. 2. Each screw 21 engages a threaded opening 22 in housing 20 and the head of the screw is positioned in an opening 23 in the casing member 17. FIG. 1 shows that there are threaded openings 22 and openings 23 are distributed about housing 20 and the casing member 17, respectively. A roller bearing 24 journals the input shaft 10 in the housing 20. Directly adjacent the eccentric extension 11, the input shaft 10 has a portion 25 of reduced diameter.

It is understood that the invention is not to be limited by the details given herein but that it may be modified within the scope of the appended claims.

The embodiments of the invention in which an exclusive property or privilege is claimed are defined as follows:

1. A speed reducer for driving an output shaft from an input shaft at a fraction of the speed of the input shaft, said speed reducer comprising an eccentric extension secured to the input shaft, a long planetary pinion having the same set of gear teeth over its entire length and being journalled on the eccentric extension, a rotatable internal gear member meshing with the pinion over a portion of its length and being attached to the output shaft, a nonrotatable internal gear member meshing with the pinion over another portion of its length and having the same diametral pitch as the rotatable internal gear member and a somewhat smaller pitch diameter and number of teeth than the rotatable inner gear member, and means mounting the nonrotatable internal gear member for shifting of its axis about a small circle during revolution of the planetary pinion about the axis of the input shaft.

2. The speed reducer specified in claim 1, the means mounting the nonrotatable internal gear member for shifting of its axis about a small circle comprising a stationary casing member loosely mounting the nonrotatable gear member, a plurality of keys formed on one of the said members and distributed about the nonrotatable internal gear member, and a plurality of keyways loosely receiving the keys and being formed on the other of said members.

3. The speed reducer specified in claim 2, the keys being formed on the nonrotatable internal gear member, the keyways being formed in the casing member.

4. The speed reducer specified in claim 3, the planetary pinion having 22 teeth, the rotatable internal gear member having 26 teeth, and the nonrotatable internal gear member having 25 teeth.

References Cited
UNITED STATES PATENTS

| | | | |
|---|---|---|---|
| 553,317 | 1/1896 | Richards | 74—805 |
| 1,514,938 | 11/1924 | Taub | 74—805 |
| 1,773,568 | 8/1930 | Braren | 74—804 |
| 2,667,076 | 1/1954 | Favre | 74—805 X |
| 2,838,952 | 6/1958 | Seeliger | 74—805 X |
| 3,045,503 | 7/1962 | Kiessling | 74—805 X |

DONLEY J. STOCKING, *Primary Examiner.*

THOMAS C. PERRY, *Examiner.*